Aug. 10, 1937.   J. OCHADLOSKI   2,089,500
AUTOMOBILE BUMPER
Filed March 21, 1936
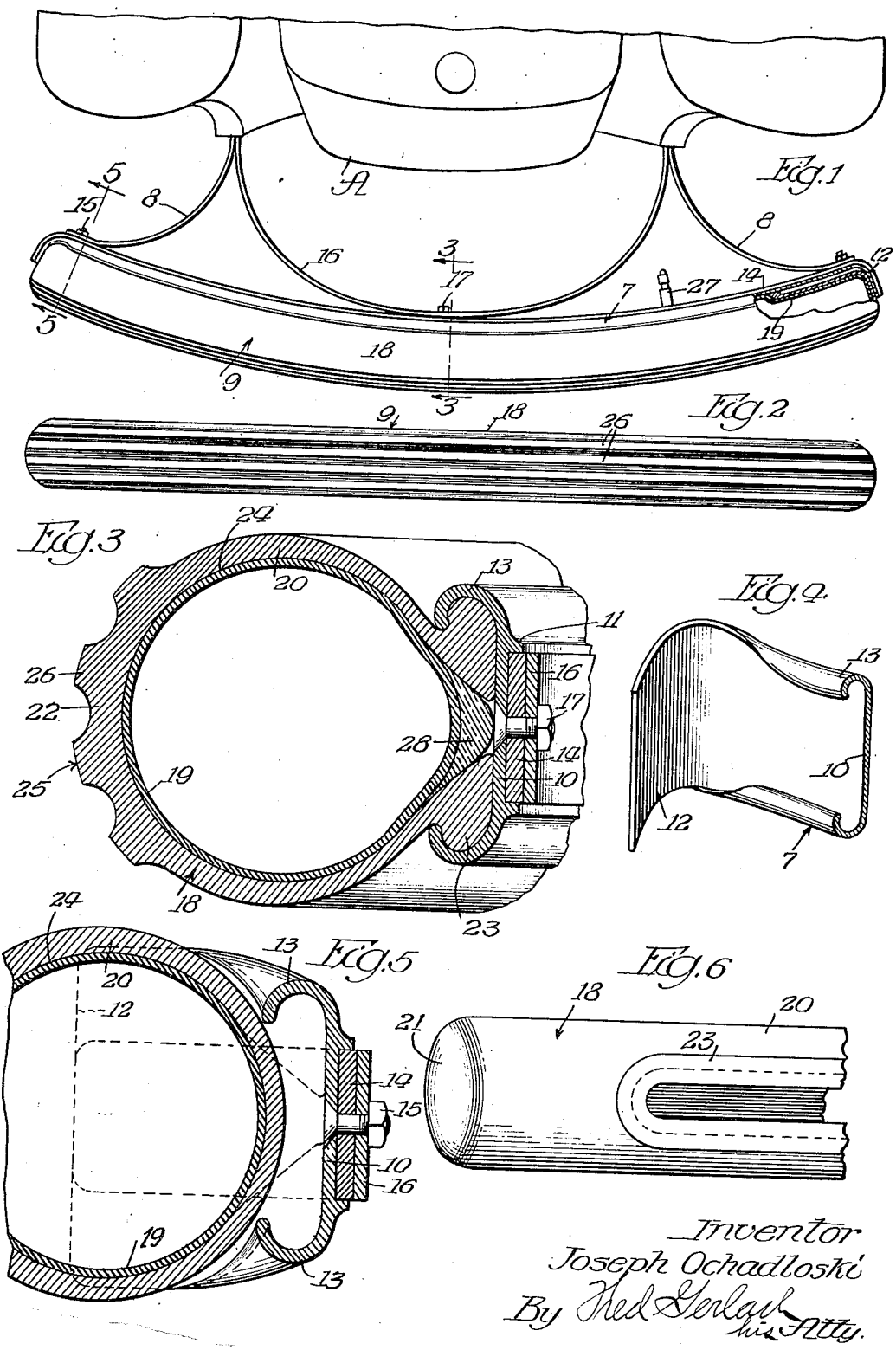
Inventor
Joseph Ochadloski
By Fred Gerlach
his Atty.

Patented Aug. 10, 1937

2,089,500

UNITED STATES PATENT OFFICE 2,089,500

AUTOMOBILE BUMPER

Joseph Ochadloski, Chicago, Ill.

Application March 21, 1936, Serial No. 70,031

9 Claims. (Cl. 293—55)

The present invention relates generally to bumpers. More particularly the invention relates to that type of bumper which is adapted for use with an automobile or like ground vehicle, serves to absorb or deaden shock resulting from collision, and comprises a horizontally extending, metallic bumper bar and a pair of spring metal brackets for attaching the bar to the side members of the frame of the automobile chassis.

One object of the invention is to provide an automobile bumper of this type which has greater shock absorbing characteristics than, and is generally an improvement upon, previously designed bumpers of the same general character by reason of the fact that it comprises in addition to the horizontally extending bumper bar, a tire-like, air inflated element which is carried by, and extends longitudinally of, the bar and serves as a cushion whereby shock and impact are efficiently and effectively absorbed and prevented from being transmitted to the automobile chassis.

Another object of the invention is to provide a bumper of the last mentioned character in which the air inflated cushion forming element comprises an outer tread-equipped casing and an inner tube and the bumper bar is in the form of a rim section which has side flanges for engaging beads on the side walls of the casing of the cushion forming element and serves due to its springiness to augment the impact absorbing properties of the cushion forming element.

Another object of the invention is to provide an automobile bumper of the type and character under consideration in which the ends of the rim-like bumper bar are bent at right angles to the central portion and form abutments or seats for engaging the ends of the cushion forming element and preventing elongation of the element when the latter is subjected to impact.

A further object of the invention is to provide a bumper of the type and character heretofore described in which the inner tube of the tire-like cushion forming element has a valve stem whereby the element may be placed under any desired pressure, and the tread of the outer casing is in the form of horizontal, longitudinal extending ribs.

A still further object of the invention is to provide an automobile bumper which is generally of new and improved construction, may be manufactured at a low and reasonable cost and is durable as well as practical.

Other objects of the invention and the various advantages and characteristics of the present bumper will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view partially in plane elevation and partially in section of a bumper embodying the invention;

Figure 2 is a front view of the bumper;

Figure 3 is an enlarged vertical section taken on the line 3—3 of Figure 1 and showing in detail the cross sectional construction and design of the tire-like cushion forming element and the rim-like bumper bar which carries the element;

Figure 4 is a detail perspective of one end of the bumper bar;

Figure 5 is an enlarged vertical transverse sectional view on the line 5—5 of Figure 1; and Figure 6 is a perspective view of one end of the tread-equipped outer casing of the cushion-forming element.

The bumper which is shown in the drawing constitutes the preferred embodiment of the invention and comprises as the main or essential parts thereof a horizontally extending bumper bar 7, a pair of bar supporting brackets 8, and a tire-like air inflated element 9. It is adapted for use in connection with an automobile A, or like ground vehicle and serves to absorb or deaden shock resulting from collision.

The bumper bar 7 is preferably formed of metallic rim stock and serves as a medium or instrumentality for supporting the air inflated element 9. It comprises a vertically extending web 10 which is preferably of such length that the ends thereof are aligned with the outer portions of the mud guards or fenders of the automobile A. The web 10 embodies a pair of vertically spaced, longitudinally extending ribs 11 on the inner face thereof and its ends, as shown in Figures 4 and 5, are bent forwardly at substantially right angles so as to form abutments or seats 12 for the ends of the air inflated member 9. The central portions of the side margins of the web are bent forwardly and inwardly to form a pair of oppositely facing side flanges 13. These flanges terminate adjacent to the abutments or seats 12 and serve, as hereinafter described, to hold the tire-like air inflated element 9 in connected relation with the bumper bar 7. In order to reinforce the bar a spring metal strip 14 is provided. This strip fits against the inner face of the web of the bar and is confined between the vertically spaced, longitudinally extending ribs 11. The ends of the strip 14 are bent outwardly and fit against and reinforce the abutments or seats 12 at the ends of the bar. The bumper bar instead of being straight is preferably arcuate or curved, as shown in Figure 1. The brackets 8 are in the form of spring metal strips and fit against the inner faces of the end portions of the reinforcing strip 14. Bolts 15 extend through the brackets 8 and the end portions of the strip 9 and the web 10 of the bumper bar 7 and serve to hold the brackets 8 and the bumper bar in connected relation. The brackets 8 project inwardly from the bumper bar 7 and embody any suitable means (not shown) at their inner ends for attachment to the ends of the side members of the chassis frame of the automobile A. The central portions of the brackets are bowed or curved toward the central portion of the bumper bar so that they are free to flex and serve to absorb shock and impact when the bumper collides or strikes against an object. The bumper in addition to the brackets 8 at the ends of the bumper bar 7 comprises a U-shaped spring metal bracket 16. This bracket is disposed between the brackets 8 and the central portion thereof fits against the central portion of the reinforcing strip 14 and between the ribs 11 of the bumper bar 7. A bolt 17 extends through the central portion of the bracket 16 and also the central portions of the strip 14 and the web 10 of the bumper bar 7 and serves to connect the bracket 16 and the bumper bar together. The ends of the bracket 16 fit against the inner ends of the brackets 8 and embody means whereby they may be attached to the side members of the chassis frame of the automobile A.

The tire-like air inflated element 9 serves as a cushion whereby shock and impact are effectively and efficiently absorbed and prevented from being transmitted to the automobile chassis. It is located in front of, and extends lengthwise or longitudinally of, the bumper bar 7 and comprises an outer casing 18 and an inner tube 19. The outer casing 18 is formed of the same material as the casing of a standard pneumatic tire and comprises a pair of side walls 20, a pair of end walls 21, and an outer wall 22. The inner margins of the side walls 20 of the casing 18 are joined together at their ends and embody enlarged beads 23 throughout the central portions thereof. These beads, as shown in Figure 3 of the drawing, fit within the oppositely facing flanges 13 along the side margins of the web 10 of the bumper bar 7. They serve in conjunction with the flanges 13 releasably to hold the casing 18 and the bumper bar in connected relation and are joined together at the ends thereof as shown in Figure 6. The end walls 21 serve as end closures for the casing and fit against the abutments or seats 12 at the ends of the bumper bar. The outer wall 22 forms with the side and end walls an elongated substantially cylindrical compartment 24 for the tube 19 and embodies a tread formation 25 on the outer portion thereof. This tread formation consists of a plurality of ribs 26 which extend horizontally and are spaced vertically apart. When the casing is fabricated white and black rubber may be used in the formation of the ribs and the grooves between the ribs so that the casing as a whole embodies contrasting colors and thus attracts attention and apprises pedestrains and automobile drivers of the presence of the automobile to which the bumper is applied. In addition to attracting attention the tread formation 25 prevents vertical slippage of the air inflated element 9 when the latter is brought into contact with an object. The inner tube 19 fits within and is shaped conformably to the compartment 24. It is formed of rubber or any other suitable material and embodies a valve equipped stem 27 whereby it may be inflated to any desired extent with air under pressure. The stem is attached to the tube in any suitable manner and projects through aligned apertures or holes (not shown) in the web 10 and the reinforcing strip 14. The inner end of the stem embodies a standard plunger type valve and has a screw thread whereby it may be connected to the discharge end of an air hose. When the tube 19 is inflated the element 9 is resilient and effectively absorbs shocks or impacts resulting from collision. An elongated fabric shoe 28 fits between the beads 23 on the inner portions of the side walls 20 of the casing 18 and serves to protect the inner portion of the inner tube 19.

In assembling the bumper the inner tube 19 is first inserted into the compartment 24 in the casing 18. Thereafter the shoe 28 is inserted between the beads 23 so as to close the compartment 24. After insertion of the shoe the casing with the inner tube therein is applied to the bumper bar 7 by snapping or manipulating the beads into interfitting relation with the flanges 13. After connection of the casing to the bumper bar 7 the element 9 is inflated by applying an air hose to the inner end of the stem 27. When the automobile A collides or strikes against any object such for example as the bumper of another automobile the shock or impact, due to the resiliency of the cushion forming element 9 is absorbed by the latter. The brackets 8 and the U-shaped bracket 16 because of the bent formation thereof flex when the bumper is struck and assist the element 9 in absorbing the shock or impact. The valve stem 27 is preferably located between one of the brackets 8 and the contiguous end of the U-shaped bracket 16. The cushion forming element 9 may be inflated to any desired extent. For a light automobile the element is preferably kept under but a small amount of pressure and for a heavy automobile it is advisable to keep the element 9 under a comparatively heavy pressure.

The herein described bumper consists of but a small number of parts and hence may be manufactured at a low and reasonable cost. Due to the resiliency of the air inflated element 9 the bumper is not only efficient in operation but is exceptionally durable and practical.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A bumper for an automobile or other vehicle, comprising in combination an elongated horizontally extending outwardly bowed bumper bar of rim type stock having the ends thereof flattened and bent outwards at right angles to form outturned abutments and embodying out-turned oppositely facing side flanges terminating inwardly of said abutments, an air inflated element positioned against and extending longitudinally of the outer face of the bar and comprising an inner tube and an outer casing extending around the inner tube and having solid substantially flat end walls seated against the abutments at the ends of the bar and side walls with joined end extremities and longitudinally extending marginal beads interlocking with the aforesaid flanges and joined together at their ends inwardly of the joined end extremities of the side walls, and bracket means for attaching the bar to the automobile.

2. A bumper for an automobile or like vehicle, comprising in combination an elongated outwardly bowed bumper bar adapted to extend substantially horizontally and having out-turned oppositely facing side flanges and a pair of vertically spaced longitudinally extending ribs along the inner face thereof, a resilient tire-like cushion forming element positioned against and extending longitudinally of the outer face of the bar and comprising an outer casing having side walls with beads interlocking with the side flanges of said bar, and means for attaching the bar and element to the automobile consisting of a pair of spring metal end brackets extending inwardly from the ends of the bar and having the central portions thereof bowed or curved in the direction of the central portion of the bar and a one piece U-shaped spring metal bracket having the central portion thereof positioned behind said central portion of the bar and between the ribs and the ends thereof extending inwardly and disposed in lapped relation with respect to the inner ends of the end brackets.

3. A bumper for an automobile or like vehicle, comprising in combination an elongated bumper bar adapted to extend substantially horizontally and having a longitudinally extending rib on the inner face thereof, a resilient cushion forming element positioned against and extending longitudinally of the outer face of the bar, a spring metal reinforcing strip extending along the inner face of the bar and abutting against the rib, and bracket means fitting against the end portions of the strip and adapted for use in attaching the bar and element to the automobile.

4. A bumper for an automobile or like vehicle, comprising in combination an elongated bumper bar adapted to extend substantially horizontally and having a pair of vertically spaced longitudinally extending ribs along the inner face thereof, an air inflated cushion forming element fitting against and extending longitudinally of the outer face of the bar, a spring metal reinforcing strip positioned between the two ribs and secured fixedly against said inner face of the bar, and bracket means applied to the strip and adapted for use in attaching the bar and element to the automobile.

5. A bumper for an automobile or like vehicle, comprising in combination an elongated bumper bar adapted to extend substantially horizontally and having outwardly extending oppositely facing side flanges, a resilient cushion forming element positioned against and extending longitudinally of the outer face of the bar and comprising an outer casing having side walls with beads interlocking with the flanges of the bar, a spring metal reinforcing strip secured against and extending longitudinally of the inner face of the bar and having the ends thereof bent outwardly at substantially right angles around the ends of the bar, and bracket means applied to the strip and adapted for use in attaching the bar and element to the automobile.

6. A bumper for an automobile or like vehicle, comprising in combination an elongated bumper bar adapted to extend substantially horizontally and having out-turned abutment forming ends and out-turned oppositely facing side flanges, a resilient cushion forming element positioned against and extending longitudinally of the outer face of the bar and comprising an outer casing having end walls seated against the abutment forming ends of the bar and side walls with beads interlocking with said side flanges, a spring metal reinforcing strip secured against and extending longitudinally of the inner face of the bar and having the ends thereof bent outwardly around and abutting against the out-turned abutment forming ends of the bar, and bracket means applied to the reinforcing strip for use in attaching the bar and element to the automobile.

7. A bumper for an automobile or like vehicle, comprising in combination an elongated horizontally extending bumper bar having out-turned oppositely facing side flanges and the ends thereof bent outwards at substantially right angles to form abutments and also having a pair of vertically spaced longitudinally extending ribs along the inner face thereof terminating at the ends thereof inwardly of the abutments, an air inflated element positioned against and extending longitudinally of the outer face of the bar and comprising an inner tube and an outer casing extending around the inner tube and having end walls seated against the abutment forming ends of the bar and side walls with beads interlocking with the side flanges, a spring metal reinforcing strip between the two ribs secured fixedly against the inner face of the bar and having the ends thereof bent outwards around and in lapped relation with the abutments, and bracket means applied to the strip and adapted for use in attaching the bar and element to the automobile.

8. A bumper for an automobile or like vehicle, comprising in combination an elongated horizontally extending bumper bar having out-turned oppositely facing side flanges and the ends thereof bent outwards at substantially right angles to form abutments and also having a pair of vertically spaced longitudinally extending ribs along the inner face thereof terminating at the ends thereof inwardly of the abutments, an air inflated element positioned against and extending longitudinally of the outer face of the bar and comprising an inner tube and an outer casing extending around the inner tube and having end walls seated against the abutment forming ends of the bar and side walls with beads interlocking with the side flanges, a spring metal reinforcing strip between the two ribs secured fixedly against the inner face of the bar and having the ends thereof bent outwards around and in lapped relation with the abutments, and means for attaching the bar and element to the automobile consisting of a pair of spring metal end brackets secured to and extending inwardly from the ends of the reinforcing strip and having the central portions thereof bowed or curved in the direction of the central portion of the bar and a U-shaped spring metal bracket having its central portion fitting against and secured to the central portion of the reinforcing strip and having its ends extending inwardly and disposed in lapped relation with the inner ends of the end brackets.

9. A bumper for an automobile or like vehicle, comprising in combination an elongated horizontally extending bumper bar having out-turned oppositely facing side flanges and the ends thereof bent outwards at substantially right angles to form abutments and also having a pair of vertically spaced longitudinally extending ribs along the inner face thereof terminating at the ends thereof inwardly of the abutments, an air inflated element positioned against and extending longitudinally of the outer face of the bar and comprising an inner tube and an outer casing extending around the inner tube and having end walls seated against the abutment forming ends of the bar and side walls with beads interlocking with the side flanges, and bracket means connected to the bar and positioned between the ribs for attaching the bar and element to the automobile.

JOSEPH OCHADLOSKI.